US007889731B1

(12) United States Patent
Lohtia et al.

(10) Patent No.: US 7,889,731 B1
(45) Date of Patent: *Feb. 15, 2011

(54) METHOD AND SYSTEM FOR WIRELESS NETWORK-BASED MESSAGING SERVICE MESSAGE DELIVERY

(75) Inventors: Anit Lohtia, Plano, TX (US); Yuqiang Tang, Plano, TX (US)

(73) Assignee: Nortel Networks Limited, Mississauga, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/703,497

(22) Filed: Feb. 10, 2010

Related U.S. Application Data

(63) Continuation of application No. 10/968,639, filed on Oct. 19, 2004, now Pat. No. 7,720,056.

(51) Int. Cl.
*H04J 3/16* (2006.01)
*H04L 12/28* (2006.01)
*H04L 12/56* (2006.01)

(52) U.S. Cl. .................. 370/389; 370/392; 370/465; 370/466

(58) Field of Classification Search .................. 370/389, 370/392, 465, 466
See application file for complete search history.

(56) References Cited

U.S. PATENT DOCUMENTS

| 6,373,930 | B1 * | 4/2002 | McConnell et al. ..... 379/114.28 |
| 6,526,033 | B1 * | 2/2003 | Wang et al. .................. 370/338 |
| 7,313,631 | B1 * | 12/2007 | Sesmun et al. ............... 709/245 |
| 7,774,008 | B2 * | 8/2010 | Benaouda et al. ........... 455/466 |
| 2001/0030957 | A1 | 10/2001 | McCann et al. |
| 2003/0067923 | A1 | 4/2003 | Ju et al. |
| 2003/0233329 | A1 * | 12/2003 | Laraki et al. ................... 705/52 |
| 2003/0235285 | A1 * | 12/2003 | Marsico .................. 379/221.13 |
| 2004/0068555 | A1 * | 4/2004 | Satou .......................... 709/219 |
| 2004/0109424 | A1 | 6/2004 | Chheda |
| 2004/0185879 | A1 | 9/2004 | Kong et al. |
| 2005/0135334 | A1 | 6/2005 | Rajkotia et al. |
| 2005/0243857 | A1 | 11/2005 | Hofstaedter et al. |
| 2006/0003740 | A1 * | 1/2006 | Munje ...................... 455/412.1 |
| 2006/0033809 | A1 | 2/2006 | Farley |
| 2006/0056419 | A1 | 3/2006 | Eichler et al. |
| 2007/0220099 | A1 * | 9/2007 | Di Giorgio et al. .......... 709/206 |
| 2007/0275738 | A1 | 11/2007 | Hewes et al. |

\* cited by examiner

*Primary Examiner*—Chi H Pham
*Assistant Examiner*—Farah Faroul
(74) *Attorney, Agent, or Firm*—Christopher & Weisberg, P.A.

(57) ABSTRACT

A system and non-transitory computer storage medium storing a computer program for delivering messages to a wireless access terminal are provided. A messaging center is in communication with a 1xEV-DO network. The messaging center is arranged to receive a message having a telephone number as a destination address for delivery to the wireless access terminal. The messaging center has a storage device and a central processing unit. The storage device stores a mapping between the telephone number, a mobile static identifier corresponding to a user of the wireless access terminal and a destination address corresponding to an IP address of the wireless access terminal in the 1xEV-DO network. The central processing unit is in communication with the storage device. The mapping between the telephone number and the IP address is based on a correspondence between the telephone number and the mobile static identifier. The mapping is evaluated to determine the IP address of the wireless access terminal in the 1xEV-DO network and the message is transmitted to the wireless access terminal using the 1xEV-DO network.

18 Claims, 3 Drawing Sheets

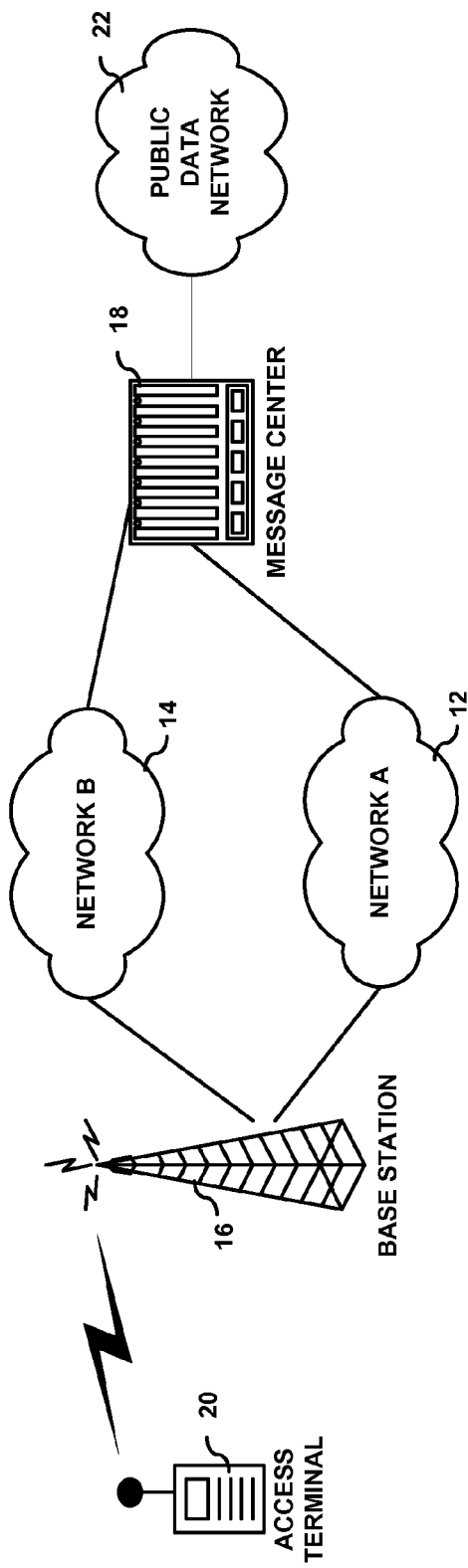

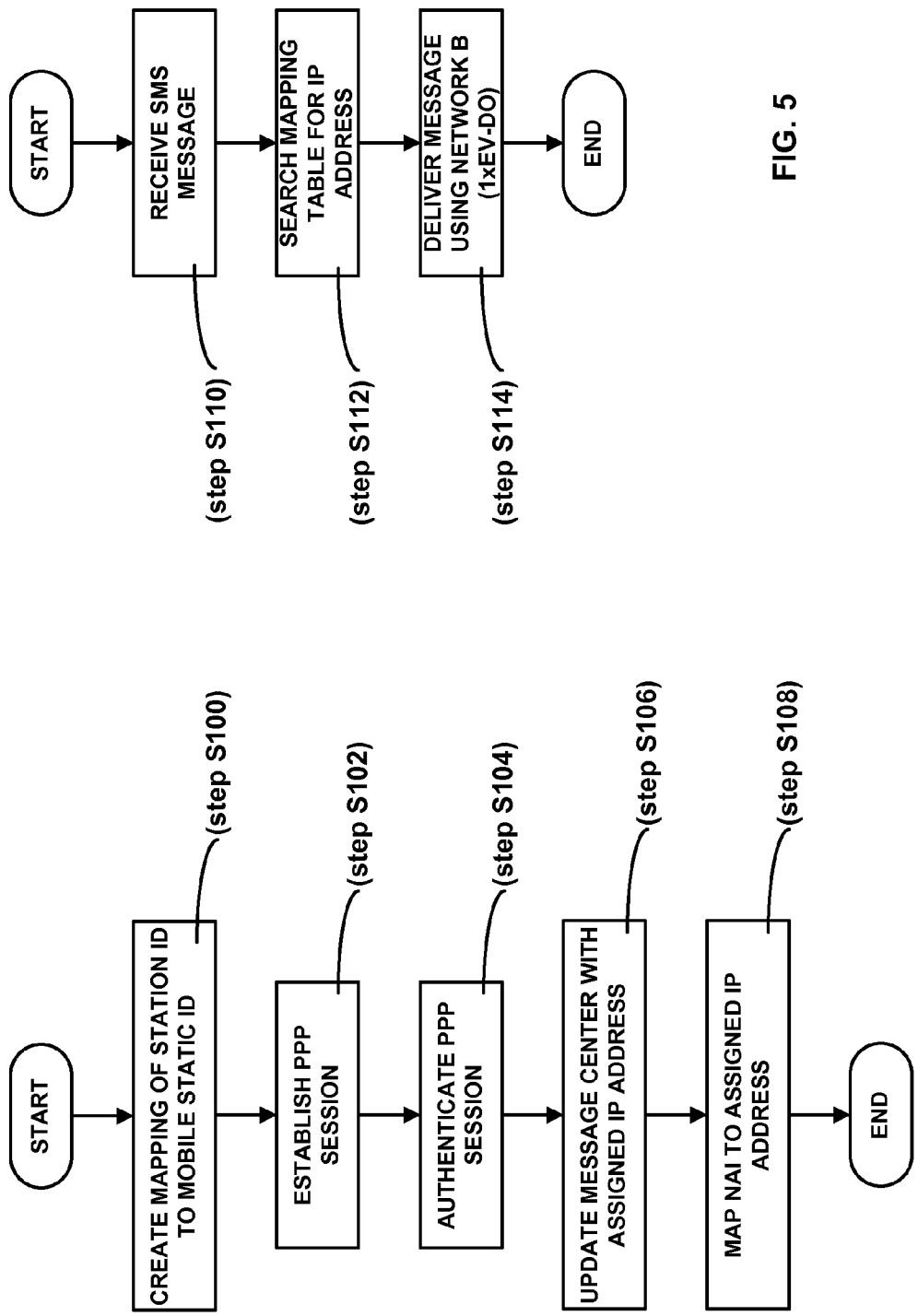

METHOD AND SYSTEM FOR WIRELESS NETWORK-BASED MESSAGING SERVICE MESSAGE DELIVERY

CROSS-REFERENCE TO RELATED APPLICATION

This application is a Continuation of U.S. patent application Ser. No. 10/968,639, now U.S. Pat. No. 7,720,056, entitled "METHOD AND SYSTEM FOR WIRELESS NETWORK-BASED MESSAGING SERVICE MESSAGE DELIVERY" filed Oct. 19, 2004, the entirety of which is incorporated herein by reference.

STATEMENT REGARDING FEDERALLY SPONSORED RESEARCH OR DEVELOPMENT n/a

BACKGROUND OF THE INVENTION

1. Statement of the Technical Field

The present invention relates to the field of messaging services on a wireless communication network, and more particularly to a method and system for efficient short or multimedia messaging service message delivery using wireless network communication infrastructures not intended to deliver these types of messages.

2. Description of the Related Art

As the affordability and availability of wireless communication technologies have increased, so too have the demands for applications that use these wireless communication technologies increased beyond mere voice communications. Short message service ("SMS") and multimedia message service ("MMS") are applications available in wireless data networks. SMS is a text message service that enables short messages of typically no more than a few hundred characters in length to be received by and transmitted from a wireless access terminal such as a cell phone, wireless personal digital assistant ("PDA"), etc. MMS is a similar messaging service used to transmit multimedia messages to and from a wireless access terminal.

Because SMS and MMS (referred to collectively herein as "SMS") applications evolved from prior generation radio transmission technologies, such as Code Division Multiple Access ("CDMA") and Time Division Multiple Access ("TDMA") wireless network communication technologies, the addressing and routing schemes for SMS messages are limited to those used in 1xRTT networks such as those based on Mobile Station Identity/International Mobile Subscriber Identity/Mobile Identity Number ("MSID/IMSI/MIN") (collectively referred to herein as "station identifier"). CDMA, TDMA and MSID/IMS/MIN standards are well defined and are well known to those of ordinary skill in the art. Accordingly, detailed descriptions of these technologies and standards are not provided herein. A station identifier is typically the telephone number of the wireless access terminal, for example, a ten digit number comprised of an area code followed by a seven digit number as is commonly used in the United States.

Because 1xRTT networks were and are primarily intended for the transmission of digitized voice transmission, these networks are not optimized to handle high data rate transmission and typically offer data transmission rates only in the 10 s of kilobits per second. New and emerging wireless transmission technologies such as third generation 1xEV-DO (evolution data-only) networks offer data rates in the multi-megabit per second range. However, unlike 1xRTT networks, wireless access devices in 1xEV-DO wireless communication networks are not identified by telephone number (station identifier). Rather, users and terminals are identified using a computer-like designation such as a user ID and network address identifier, for example, user@domain.com. In this example, "user" refers to the user ID and "domain.com" is the network address identifier. This addressing designation is assigned to a user and is referred to herein as a "mobile static identifier". Addressing schemes for user ID and network access identifier networks such as those used in 1xEV-DO networks are known in the art. When a 1xEV-DO wireless access terminal user logs into the network, the mobile static identifier is associated with a internet protocol ("IP")—address so that data destined for the wireless access terminal can be routed through the 1xEV-DO network to the wireless access terminal. Accordingly, routing in a 1xEV-DO network is based on the -IP protocol. In contrast, routing in a 1xRTT network is based on the station identifier (telephone number) and uses a different routing technology such as signaling system 7 ("SS 7").

The incompatibility between wireless access terminal identification schemes and network routing schemes means that SMS messages formed using 1xRTT station identifiers cannot be delivered to wireless access terminals or routed on 1xEV-DO networks or any network for which arrangement for identifying wireless access terminals is other than the standardized 1xRTT schemes. Accordingly, wireless network service providers cannot support the popular SMS applications on 1xEV-DO networks.

This problem is exacerbated as wireless service network service providers deploy high speed wireless network infrastructures such as 1xEV-DO networks while maintaining the older technology 1xRTT networks. Wireless network service providers need to position their offerings such that the older technology networks such as 1xRTT networks can eventually be phased out. However, because SMS applications rely on the station identifier addressing and routing schemes, wireless network service providers will be forced to maintain parallel networks or discontinue the offering of SMS applications.

One solution that has been proposed is to use a 1xEV-DO wireless access terminal in a hybrid mode to support both 1xEV-DO networks and 1xRTT networks so that the standard mechanism for SMS delivery can be supported on the same wireless access terminal. This arrangement has shortcomings. For example, the wireless access terminal must monitor both 1xRTT and 1xEV-DO carriers, thereby reducing the throughput of the wireless access terminal when the wireless access terminal tunes to the 1xRTT carrier to check for the message. Also, monitoring both 1xRTT and 1xEV-DO carriers reduces the battery life of the wireless access terminal, thereby requiring more frequent recharging. In addition, the complexity of the wireless access terminal is increased because it must be designed and incorporate hardware and software to support two different types of carriers and two different air interface methodologies.

It is therefore desirable to have a method and system which allows SMS messages to be delivered to and from a wireless access terminal using only a network which uses a network access identifier/user ID addressing and routing scheme, such as those currently offered by 1xEV-DO networks, without the need for changes to well known standards and without the need to support multiple carrier formats, addressing and routing schemes, etc. It is also desirable to have a system and method for SMS message delivery which does not require that a wireless network service provider maintain parallel network technologies if it does not desire to do so.

SUMMARY OF THE INVENTION

The present invention addresses the deficiencies of the art in respect to routing SMS and MMS messages on a network which uses a network access identifier/user ID addressing and routing scheme.

In accordance with one aspect, the present invention provides a system for delivering messages to a wireless access terminal in which a 1xEV-DO network uses an IP communication protocol. A messaging center is in communication with the 1xEV-DO network. The messaging center is arranged to receive a message having a telephone number as a destination address for delivery to the wireless access terminal. The messaging center has a storage device and a central processing unit. The storage device stores a mapping between the telephone number, a mobile static identifier corresponding to a user of the wireless access terminal and a destination address corresponding to an IP address of the wireless access terminal in the 1XEV-DO network. The central processing unit is in communication with the storage device. The mapping between the telephone number and the IP address is based on a correspondence between the telephone number and the mobile static identifier in which the mobile static identifier includes a user id and a domain. The central processing unit evaluates the mapping to determine the IP address of the wireless access terminal in the 1xEV-DO network and transmits the message to the wireless access terminal using the 1xEV-DO network.

In accordance with another aspect, the present invention provides a system for delivering messages to a wireless access terminal in which a 1xEV-DO network uses an IP communication protocol. A messaging center is in communication with the 1xEV-DO network. The messaging center is arranged to receive a message having a telephone number as a destination address for delivery to the wireless access terminal. The messaging center has a storage device and a central processing unit. The storage device stores a mapping between the telephone number, a mobile static identifier corresponding to a user of the wireless access terminal and a destination address corresponding to an IP address of the wireless access terminal in the 1xEV-DO network. The central processing unit is in communication with the storage device. The mapping between the telephone number and the IP address is based on a correspondence between the telephone number and the mobile static identifier. The central processing unit evaluates the mapping to determine the IP address of the wireless access terminal in the 1xEV-DO network and transmits the message to the wireless access terminal using the 1xEV-DO network.

In accordance with still yet another aspect, the present invention provides a non-transitory computer-readable storage medium storing a computer program which when executed performs a method for delivering messages constructed in a first communication protocol to a wireless access terminal in a communication network having a second communication protocol different from the first communication protocol. A message in the first communication protocol is received for delivery to the wireless access terminal. A mapping between a first destination address corresponding to a first communication protocol destination address of the wireless access terminal in the first communication protocol, a mobile static identifier including a user id and a domain, and a second communication protocol destination address corresponding to a destination address of the wireless access terminal in the communication network is stored. The mapping between the first communication protocol destination address and the second communication protocol destination address is based on a correspondence between the first communication protocol destination address and the mobile static identifier. The mapping is evaluated to determine the second protocol destination address of the wireless access terminal in the communication network. The message is transmitted to the wireless access terminal using the second protocol destination address and the communication network.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a high level diagram of a system constructed in accordance with the principles of the present invention;

FIG. 2 is a mapping table constructed in accordance with the principles of the present invention;

FIG. 4 is a flow chart of the mapping process of the present invention; and

FIG. 5 is a flow chart of the message delivery process of the present invention.

DETAILED DESCRIPTION OF THE PREFERRED EMBODIMENTS

Figure 3:
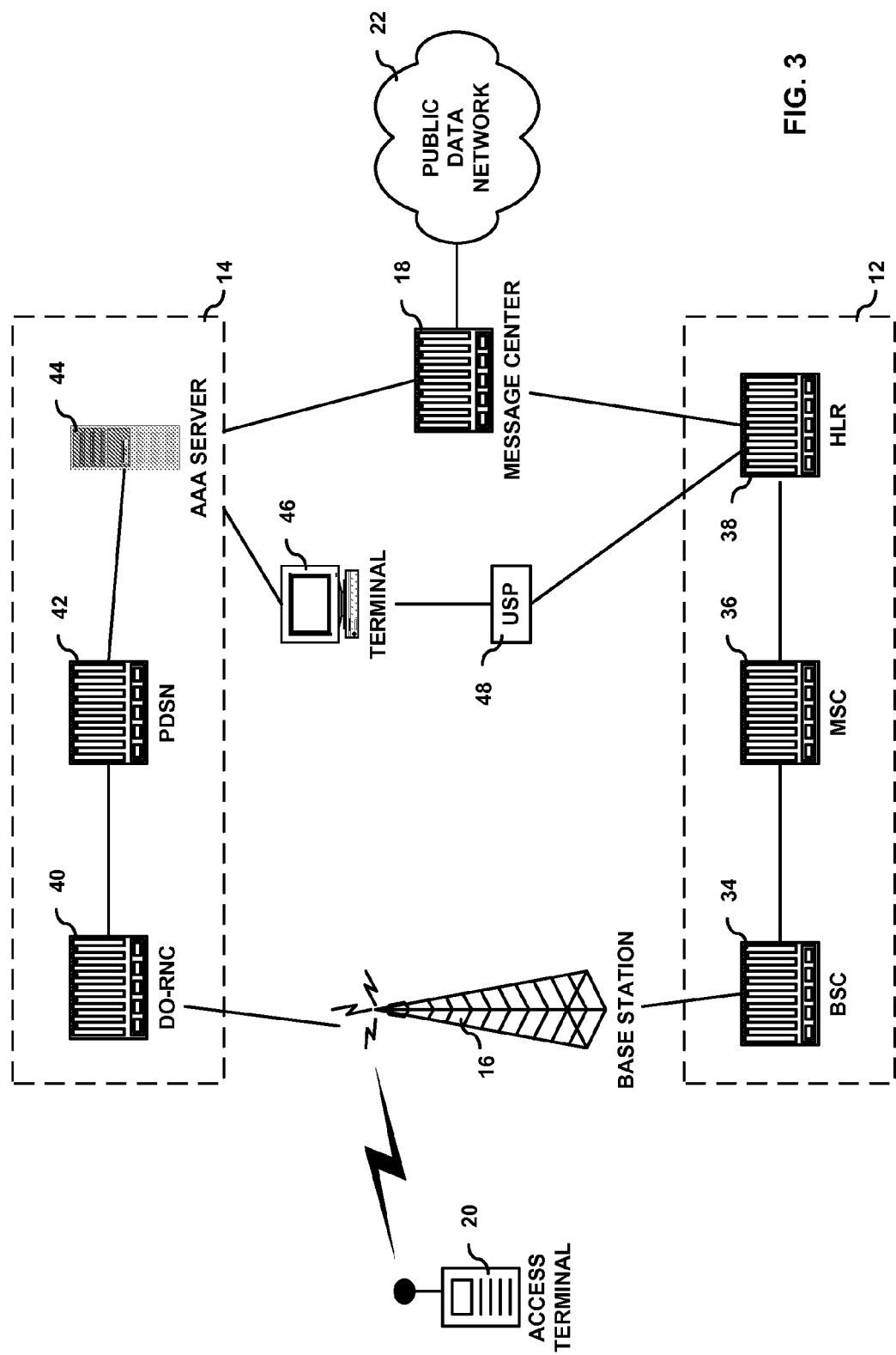
FIG. 3 is a detailed diagram of the system constructed in accordance with the principles of the present invention diagram.

Initially, it is noted that the terms "short messaging system" ("SMS"), "multimedia messaging system" ("MMS") and "messaging system" as used herein refer to a system for delivering messages, whether text only or multimedia, to a wireless mobile device. It is understood that, while the standards for the specific packet formats for SMS and MMS messages may differ, the method and system of the present invention are equally applicable to both formats as well as any messaging format used or intended to be used to communicate messages to a wireless mobile device.

Referring now to the drawing figures in which like reference designators refer to like elements, there is shown in FIG. 1 a diagram of a system constructed in accordance with the principles of the present invention and referred to generally as '10'. System 10 includes network A 12 and network B 14 in which both network A 12 and network B 14 are in data communication with base station 16 and message center 18. Wireless access terminal 20 is arranged to be in wireless communication with base station 16, and message center 18 is in data communication with public data network 22. Public data network 22 can be any network suitable for transporting data from message center 18 to a remote user terminal. An example of public data network 22 is the internet.

Network A 12 is a network, such as a 1xRTT network, arranged to transport SMS (or MMS) messages in their native station identifier format from message center 18 to base station 16 for wireless transmission to access terminal 20 and vice versa. Network A 12 uses a communication protocol such as signaling system 7 and other known packet formats and routing mechanisms as may be known in the art to route an SMS (or MMS) message between message center 18 and base station 16 using a station identifier such as an MSID/MIN/IMSI type of telephone number identifier.

Network B 14 is a network, such as a 1xEV-DO network, arranged to transport data between message center 18 and base station 16 for delivery to or from wireless access terminal 20 using a packet format and/or routing protocol different from that supported by network A 12. For example, as discussed above, while network A 12 uses signaling system 7 as its packet and routing mechanism for native SMS and MMS message delivery, network B 14 uses IP-based routing based on an IP address assigned to wireless access terminal 20 which, itself, directly relates to the network access identifier and user ID assigned to the user and wireless access terminal 20. As noted above, an example of a mobile static identifier, which is comprised of a network access identifier and user ID is user@domain.com.

Base station 16 can be of the type operable in accordance with any of a variety of technologies, such as CDMA, TDMA, and OFDM to receive information from one or more wireless service provider networks such as network A 12 and/or network B 14 for wireless transmission to one or more wireless access terminals 20 and vice versa. For example, known base station technologies and wireless air interfaces, such as Third Generation Partnership Project 2 C.S0024 V2.0 cdma2000 High Rate Packet Air Interface Specification, are applicable with respect to the present invention. Accordingly, it is contemplated that one of ordinary skill in the art could implement a base station 16 to support the wireless data transmission aspects of the invention described herein.

Wireless access terminal 20 can be any wireless access terminal such as a cell phone, wireless PDA and the like, capable of sending and receiving SMS or MMS messages using a suitable wireless air interface for communication with base station 16. For example, it is contemplated that wireless access terminal 20 can receive SMS messages via network B 14 as is described in detail below. Because the data packet transmission formats for wireless communication networks such as Network B 14 are known, for example, 1xEV-DO networks, access terminal 20 does not require specialized software or hardware to be able to receive SMS messages transmitted to or from wireless access terminal 20 via network B 14.

Although the primary method of SMS message delivery in accordance with the present invention is via Network B 14, it is contemplated that wireless access terminal 20 can also be arranged to send and received SMS messages to and from message center 18 via Network A 12. In this manner, wireless network service providers can phase in SMS message delivery using technology such as 1xEV-DO technology (network B 14) and phase out legacy implementations of 1xRTT networks (network A 12).

Message center 18 includes hardware for SMS (and MMS) forwarding of the type known in the art along with such software as is needed to implement the functions of the present invention as described herein. Message center 18 serves as a gateway between public data network 22 and communication networks 12 and 14. While SMS messages received by message center 18 from public data network 22 were previously transmitted to base station 16 via network A 12 due to addressing and routing using station identifier format constraints, i.e. using SS7 technology, in accordance with the present invention, message center 18 is arranged to deliver SMS messages to base station 16 via network B 14 using a native SMS routing protocol other than that used on network A 12, for example, using the IP protocol within network B 14.

Messaging center 18 includes volatile and non-volatile storage media, interfaces for the input and output of data, for example, to/from public data network 22 and Networks 12 and 14, along with a central processing unit, which executes software stored on the volatile and/or non-volatile storage medium to control the operation of message center 18. Message center 18 may also include interfaces to allow an operator to configure the device. One of ordinary skill in the art will understand that message center 18 can be a specialized computer having typical computer hardware components and software which allows messaging center 18 to perform the functions described herein as well as those typically associated with the storage and forwarding of SMS and MMS messages.

Message center 18 stores a mapping in a storage device which maps station identifiers to mobile static identifiers and assigned IP addresses so that incoming SMS and MMS messages can be delivered to wireless access terminal 20 using network B 14 (1xEV-DO). An example of such mapping is shown in FIG. 2. Mapping 24 includes mobile static identifier column 26, station identifier 28 and assigned IP address column 30. Such a mapping can be stored as a flat file, in a database or any other suitable arrangement in the storage device of message center 18. As is shown in FIG. 2, each row 32 therefore includes a station identifier, such as 123-555-1111, a corresponding mobile static identifier such as user@domain and a dynamically assigned IP address such as 192.168.1.1. The configuration and updating of mapping 24 is described in detail below. When a SMS or MMS message is received at message center 18 from public data network 22, message center 18 uses the destination station identifier indicated in the received SMS or MMS message to determine the assigned destination -IP address, and routes the SMS message on network B 14 accordingly. The message is ultimately received at base station 16, which then uses a suitable air interface and delivers the message to wireless access terminal 20. Advantageously, in accordance with the present invention, although the message received by message center 18 contains a destination address which corresponds to an address routable on network A 12, such as a telephone number, message center 18 evaluates mapping 24 and routes the SMS message using the protocol of network B 14 on network B 14.

FIG. 3 is a detailed diagram of system 10 showing components included as part of network A 12 and network B 14. Network A 12 includes components typically implemented with a 1xRTT SS7-based wireless communication network infrastructure and includes base station controller ("BSC") 34, mobile switching center ("MSC") 36 and home location register ("HLR") 38. BSC 34 can be any base station controller as is known in the art for implementation in 1xRTT networks. BSC 34 provides radio signal management functions and supports the physical links between MSC 36. Typically, BSCs 34 includes hardware and software to provide functions including handover, frequency assignment and control of radio frequency power levels in base stations 16. Typically, a number of BSCs 34 are served by a single MSC 36.

MSC 36 can be any mobile switching center known in the art for supporting 1xRTT networks. MSC 36 includes hardware and software to perform telephony switching functions as well as other functions such as toll ticketing, signaling and the like. HLR 38 can be any home location registry known in the art for determining the location of a wireless access terminal 20 so that calls and SMS (and MMS) messages can be properly routed through the network using SS 7 from MSC 36 to BSC 34 to base station 16 supporting the destination wireless access terminal 20.

Network B 14 includes 1xEV-DO radio network controller ("DO-RNC") 40, packet data serving node ("PDSN") 42 and authentication, authorization and accounting ("AAA") server 44. DO-RNC 40 can be any RNC known in the art capable of performing radio network control functions for a network such as a 1xEV-DO network. DO-RNC 40 performs ostensibly the same functions as BSC 34 with a difference being that DO-RNC 40 is arranged to communicate using a data network-oriented protocol such as IP. DO-RNC 40 is responsible for radio resource management as well as mobility management.

PDSN 42 acts as a gateway to public data networks such as public data network 22 for networks such as a 1xEV-DO network. PDSN 42 can be any PDSN known in the art operable to perform traffic aggregation functions as well as establish data connection sessions with wireless access terminals 20. It is contemplated that one of ordinary skill in the art could design a suitable PDSN 42 using hardware and software, as appropriate, to support the functions of the present invention as described herein. Although described below in more detail, PDSN 42 is arranged to establish a point-to-point ("PPP") communication session with a wireless access terminal 20 for the exchange of data between wireless access terminal 20 and public data network 22. Of note, although FIG. 3 shows PDSN 42 coupled to public data network 22 via AAA server 44 and message center 18, such illustration is shown merely for convenience and simplicity in aiding explanation of the present invention. It is contemplated that the elements of network B 14 can be coupled to their own networking infrastructure, including direct connection to public data network 22 or any combination thereof. Accordingly, in accordance with the present invention, access to public data network 22 is not limited to communications through message center 18. Rather, message center 18 is shown in FIG. 3 as the connection point to public data network 22 to aid understanding of SMS and MMS message delivery in accordance with the present invention. It is understood that network B 14 is also used to support voice calls and applications other than SMS and MMS message delivery. Similarly, arrangement of components within network A 12 as shown in FIG. 3 is shown for ease of understanding, it being understood that the components comprising network A 12 can be connected to a suitable network infrastructure. Accordingly, communications within network A 12 are not limited to BSC 34 to MSC 36 to HLR 38 and vice versa.

AAA server 44 can be any computing platform capable of supporting the functions described herein. For example, AAA server 44 can be an AAA server as may be known in the art modified to support the functions of the present invention. It is contemplated that an AAA server 44 includes volatile and non-volatile storage, network interfaces for engaging in communication with the other devices within network B 14, message center 18 and terminal 46, a central processing unit and other input/output hardware as may be necessary to allow for configuration of AAA server 44 and data extraction, and monitoring.

AAA server 44 performs authentication of wireless access terminal 20. This authentication can be based on the mobile static identifier and can be in the form of a user ID/password based authentication. AAA server 44 therefore works in conjunction with PDSN 42 to authenticate a wireless access terminal 20 (and its associated user) to establish a PPP session. Methods for device and/or user authentication, as well as methods for 1xEV-DO session establishment between a wireless access terminal 20 and DO-RNC 40, are known in the art and not discussed herein.

As shown in FIG. 3, system 10 also includes terminal 46, which is arranged to engage in data communication with AAA server 44 and arranged to engage in data communication with HLR 48 via universal signaling point ("USP") 48. Terminal 46 can be any computing device, such as a personal computer, hand held computer, PDA, minicomputer or mainframe computer. In one embodiment, terminal 46 is programmed to engage in IP communication with AAA server 44 to configure AAA server 44. USP 48 converts the data communication protocol of terminal 46 to a protocol compatible with HLR 38. For example, USP 48 can convert IP protocol-based communication from terminal 46 to SS 7 for communication to HLR 38 and vice versa. Devices for converting between IP and SS 7 are known in the art. In accordance with the present invention, terminal 46 can therefore be used to configure AAA server 44 and HLR 38 for operations including SMS and MMS message delivery.

Although FIGS. 1 and 3 show network A 12, a network which can natively route SMS and MMS messages using station identifier 28, the present invention is not limited to implementations which include network A 12 and network B 14. Although system 10 can be implemented with both networks to allow the phase in of newer generation networks such as 1xEV-DO networks (network B 14) along side of older generation 1xRTT networks (network A 12) to support the migration of SMS and MMS message transport on network B 14, it is contemplated that the present invention can be implemented without network A 12. In other words, as long as message center 18 is equipped with mapping 24, SMS and MMS messages received by message center 18 bearing a station identifier 28 as the destination address can be mapped and routed using network B 14. Therefore, implementations of the present invention can be accomplished using solely network B 14, such as 1xEV-DO networks.

The process of creating mapping 24 is explained with reference to FIGS. 3 and 4. Initially, a system operator or other wireless service provider personnel creates a mapping of the station identifier to mobile static identifier (step S100). For example, as operator may use terminal 46 to establish this mapping in AAA server 48 so that the mapping between station identifiers and mobile static identifiers is stored in AAA server 48. Referring to FIGS. 2 and 3, the station identifier column 28 and mobile static identifier column 26 in mapping 24 is configured by an operator in AAA server 44, which is then loaded to a storage device within message center 18. Of course, message center 28 can be configured directly by an operator without the need to store such information in AAA server 44.

When the user of wireless access terminal 20 turns on the device or attempts to log in to network B 14, a PPP session is established using PDSN 42 (step S102) this session is authenticated (step S104) by AAA server 44 to validate that the user and/or wireless access terminal 20 has the authorization to use network B 14. The establishment and authentication of the PPP session of steps S102 and step S104 results in a dynamic assignment of an IP address to wireless terminal 20. In other words, although the mobile static identifier shown in mobile static identifier column 26 of mapping 24 in FIG. 2 is assigned to a particular and/or wireless access terminal 20, the dynamically assigned IP address shown in assigned IP address column 30 of mapping 24 is assigned each time a PPP session is established and authenticated. The assigned IP address can differ each time a new session is established with a wireless access device 20.

As part of the authentication process, AAA server 44 learns what the assigned IP address corresponding to the mobile static identifier 26 is, and updates message center 18 with the assigned IP address (step S106). Message center 18 updates mapping 24 to map the assigned IP address column 30 to station identifier column 28 based on mobile static identifier column 26 (step S108). Because there is a correspondence between a mobile static identifier and assigned IP address (from AAA server 44), and because message center 18 has been preconfigured with a portion of mapping 24 to create a correspondence between a mobile static identifier and a station identifier, a dynamically assigned IP address can be mapped to a station identifier. The resultant mapping is that shown as mapping 24 in FIG. 2. For example, a resultant typical mapping created in accordance with the present invention would result in mapping row 32 in which station identifier "123-555-1111" is mapped to dynamically assigned IP address 192.168.1.1. The result is therefore that the storage device in message center 18 stores a mapping between a first destination address in a first communication protocol such as SS 7 in the format of wireless network A 12 and a second communication protocol destination address corresponding to the destination of the wireless access terminal in the format of network B 14 such as a destination IP address.

The handling of an incoming SMS (or MMS) message is explained with reference to FIGS. 2, 3 and 5. When an SMS message is received by message center 18 (step S110), message center 18 searches mapping table 24 to determine the dynamically assigned IP address corresponding to the destination station identifier address included as part of the SMS or MMS message (step S112). Message center 18 then transmits the message to wireless access terminal 20 using wireless network B (step S114) such that the basis of the routing is the IP address assigned to wireless access terminal 20. The telephone number assigned to wireless access terminal 20 can optionally be included in the SMS or MMS message, but is not used as the basis for routing the message on network B 14.

The present invention therefore advantageously provides a method and system which allows for the delivery of SMS and MMS messages using a wireless service provider transport infrastructure which is not designed to natively transport these messages using the destination information included as part of the SMS or MMS message, namely, the station identifier telephone number. The present invention allows for the migration from older generation wireless transport networks such as 1xRTT networks to newer high speed networks such as 1xEV-DO networks in a manner which causes minimal disruption and does not require change to the way SMS and MMS messages are created and formatted in a public data network.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system having a central processing unit and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computer system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

We claim:

1. A system for delivering messages to a wireless access terminal, the system comprising:
   a messaging center in communication with a 1xEV-DO network, the messaging center arranged to receive a message having a telephone number as a destination address for delivery to the wireless access terminal, the messaging center having:
      a storage device storing a mapping between the telephone number, a mobile static identifier corresponding to a user of the wireless access terminal, and an IP address of the wireless access terminal in the 1xEV-DO network, the mapping between the telephone number and the IP address being based on a correspondence between the telephone number and the mobile static identifier, the mobile static identifier including a user id and a domain; and
      a central processing unit in communication with the storage device, the central processing unit being configured to:
         evaluate the mapping to determine the IP address of the wireless access terminal in the 1xEV-DO network; and
         transmit the message to the wireless access terminal using the 1xEV-DO network.

2. The system according to claim 1, wherein the IP address is dynamically assigned to the wireless access terminal as part of the establishment of a communication session between the wireless access terminal and the 1xEV-DO network, the 1xEV-DO network including an authentication device in communication with the wireless access terminal and the messaging center, the authentication device providing the dynamically assigned IP address to the messaging center for inclusion in the mapping.

3. The system messaging center according to claim 2, wherein the static identifier is formatted based on an IP protocol, and wherein a row in the mapping includes a static identifier and telephone number, the central processing unit in the messaging server being further configured to dynamically update the row to include the dynamically assigned IP address when the authentication device authenticates the wireless access terminal.

4. The system according to claim 3, further including a packet data serving node in communication with the authentication device and the wireless access terminal, the packet data serving node receiving authentication data from the authentication device using a point-to-point protocol.

5. The system according to claim 1, further including:
a network administration terminal in communication with the 1xEV-DO network, the 1xEV-DO network using an IP protocol; and
a signaling device in communication with the network administration terminal and another communication network using a first communication protocol that is different from the IP protocol, the signaling device configured to convert the first communication protocol to the IP protocol and convert the IP protocol to the first communication protocol, the network administration terminal:
including a network interface arranged for communication using the IP protocol;
being configured to configure at least one device within the other communication network and at least one device within the 1xEV-DO communication network; and
being configured to communicate with the at least one device within the 1xEV-DO communication network using the IP protocol and communicating with the at least one device within the other communication network via the signaling device.

6. A system for delivering messages to a wireless access terminal, the system comprising:
a messaging center in communication with a 1xEV-DO network, the messaging center arranged to receive a message having a telephone number as a destination address for delivery to the wireless access terminal, the messaging center having:
a storage device storing a mapping between the telephone number, a mobile static identifier corresponding to a user of the wireless access terminal, and an IP address of the wireless access terminal in the 1xEV-DO network, the mapping between the telephone number and the IP address being based on a correspondence between the telephone number and the mobile static identifier; the mobile static identifier including a user id and a domain; and
a central processing unit in communication with the storage device, the central processing unit being configured to:
evaluate the mapping to determine the IP address of the wireless access terminal in the 1xEV-DO network; and
transmit the message to the wireless access terminal using the 1xEV-DO network.

7. The system according to claim 6, wherein the IP address is dynamically assigned to the wireless access terminal as part of the establishment of a communication session between the wireless access terminal and the 1xEV-DO network, the 1xEV-DO network including an authentication device in communication with the wireless access terminal and the messaging center, the authentication device providing the dynamically assigned IP address to the messaging center for inclusion in the mapping.

8. The system messaging center according to claim 7, wherein the static identifier is formatted based on an IP protocol, and wherein a row in the mapping includes a static identifier and telephone number, wherein the central processing unit in the messaging center is further configured to dynamically update the row to include the dynamically assigned IP address when the authentication device authenticates the wireless access terminal.

9. The system according to claim 8, further including a packet data serving node in communication with the authentication device and the wireless access terminal, the packet data serving node receiving authentication data from the authentication device using a point-to-point protocol.

10. The system according to claim 6, further including:
a network administration terminal in communication with the 1xEV-DO network, the 1xEV-DO network using an IP protocol; and
a signaling device in communication with the network administration terminal and another communication network using a first communication protocol that is different from the IP protocol, wherein the signaling device is configured to convert the first communication protocol to the IP protocol and convert the IP protocol to the first communication protocol, the network administration terminal:
including a network interface arranged for communication using the IP protocol;
being configured to configure at least one device within the other communication network and at least one device within the 1xEV-DO communication network; and
being configured to communicate with the at least one device within the 1xEV-DO communication network using the IP protocol and communicating with the at least one device within the other communication network via the signaling device.

11. A non-transitory computer-readable storage medium storing a computer program which when executed performs a method for delivering messages constructed in a first communication protocol to a wireless access terminal in a communication network having a second communication protocol different from the first communication protocol, the method comprising:
receiving a message in the first communication protocol for delivery to the wireless access terminal;
storing a mapping between a first destination address corresponding to a first communication protocol destination address of the wireless access terminal in the first communication protocol, a mobile static identifier including a user id and a domain, and a second communication protocol destination address corresponding to a destination address of the wireless access terminal in the communication network, the mapping between the first communication protocol destination address and the second communication protocol destination address being based on a correspondence between the first communication protocol destination address and the mobile static identifier;
evaluating the mapping to determine the second protocol destination address of the wireless access terminal in the communication network; and
transmitting the message to the wireless access terminal using the second protocol destination address and the communication network.

12. The non-transitory computer-readable storage medium according to claim 11, wherein the message is one of a short messaging system message and a multimedia messaging system message.

13. The non-transitory computer-readable storage medium according to claim 12, wherein the second communication protocol is an IP protocol.

14. The non-transitory computer-readable storage medium according to claim 13, wherein the communication network is a 1xEV-DO network.

15. The non-transitory computer-readable storage medium according to claim 11, wherein the method further comprises dynamically assigning the second communication protocol destination address to the wireless access terminal as part of the establishment of a communication session between the wireless access terminal and the communication network.

16. The non-transitory computer-readable storage medium according to claim 15, wherein the method further comprises receiving authentication data, the authentication data being transmitted using a point-to-point protocol.

17. The non-transitory computer-readable storage medium according to claim 16, wherein a row in the mapping includes the mobile static identifier and first destination address, the method further comprising dynamically updating the row to include the dynamically assigned second communication protocol destination address when the wireless access terminal is authenticated.

18. The non-transitory computer-readable storage medium according to claim 11, wherein the first communication protocol is signaling system seven.

* * * * *